Figure 1:
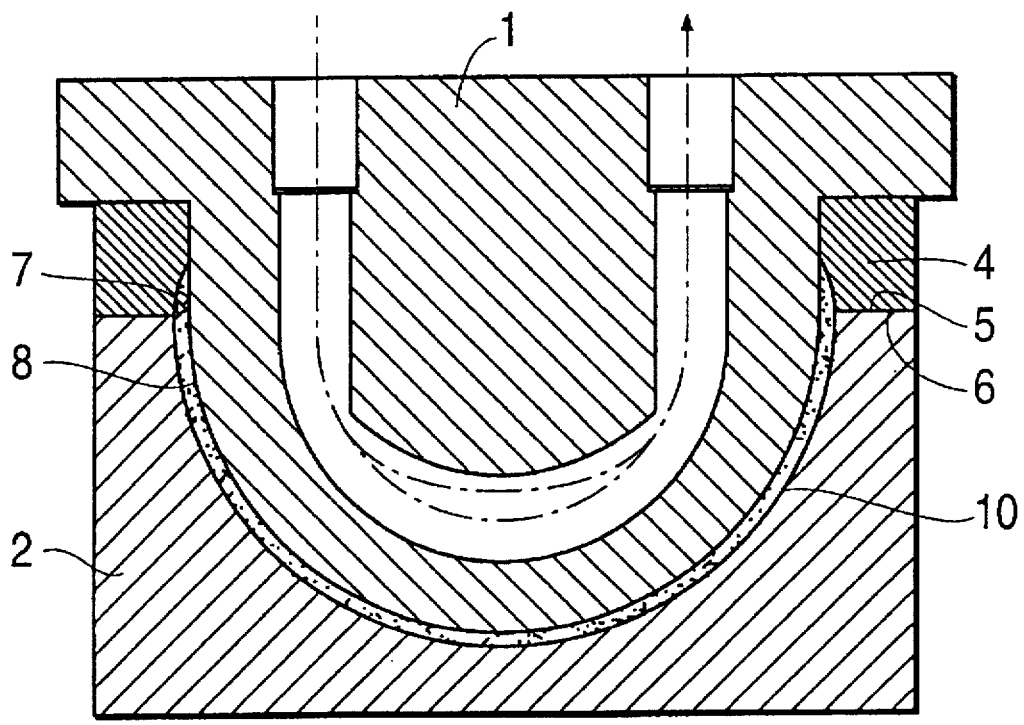

United States Patent [19]
Aasted

[11] Patent Number: 5,635,230
[45] Date of Patent: Jun. 3, 1997

[54] METHOD AND APPARATUS FOR PRODUCING SHELLS OF FAT-CONTAINING, MASSES AND FOOD ARTICLES PRODUCED THEREBY

[75] Inventor: Lars Aasted, Charlottenlund, Denmark

[73] Assignee: Aasted-Mikkoverk ApS, Denmark

[21] Appl. No.: 524,168

[22] Filed: Aug. 31, 1995

Related U.S. Application Data

[63] Continuation of Ser. No. 252,561, Jun. 1, 1994, abandoned.

[30] Foreign Application Priority Data

May 31, 1994 [DK] Denmark .................. 0610/94

[51] Int. Cl.$^6$ .................................................. A23G 1/21
[52] U.S. Cl. ................... 426/138; 426/89; 426/279; 426/280; 426/282; 426/512; 426/514; 425/262
[58] Field of Search .......................... 426/89, 93, 138, 426/279, 280, 282, 284, 512, 514, 515, 391, 390; 425/262

[56] References Cited

U.S. PATENT DOCUMENTS

| | | | |
|---|---|---|---|
| 1,260,074 | 3/1918 | Sebring et al. | 425/292 |
| 1,417,446 | 5/1922 | Brigham | 426/282 X |
| 1,647,944 | 11/1927 | Villasenor | 425/216 |
| 1,856,153 | 5/1932 | Borg | 426/515 |
| 3,045,284 | 7/1962 | Peras | 425/292 X |
| 3,557,716 | 1/1971 | Westin | 118/21 |
| 3,666,388 | 5/1972 | Oberwelland et al. | 426/515 X |
| 4,209,289 | 6/1980 | Newcomb et al. | 425/410 |
| 4,426,402 | 1/1984 | Kaupert | 426/515 |
| 5,409,722 | 4/1995 | Binley | 426/515 |

FOREIGN PATENT DOCUMENTS

| | | |
|---|---|---|
| 0 589 820 A1 | 3/1994 | European Pat. Off. . |
| 122020 | 7/1901 | Germany . |
| 860446 | 12/1932 | Germany . |
| 2435682 | 6/1986 | Germany . |
| 726814 | 3/1955 | United Kingdom . |
| 996995 | 6/1965 | United Kingdom . |
| 9315613 | 8/1993 | WIPO .................. 426/515 |

Primary Examiner—Milton Cano
Attorney, Agent, or Firm—Finnegan, Henderson, Farabow, Garrett & Dunner, L.L.P.

[57] ABSTRACT

A method and a system for the production of shells of fat-containing, chocolate-like masses. A cooling member (1) having a temperature below 0° C. is immersed in a predosed mass in a mould cavity (2). The cooling member (1) comprises protruding, peripheral engagement parts (4) having a recess (7, 8) which defines a reception volume that geometrically determines the upper, annular rim of the shell (10). This obviates further processing of the shell rim before the shell is joined with other parts. A tight joint is simultaneously ensured.

18 Claims, 3 Drawing Sheets

METHOD AND APPARATUS FOR PRODUCING SHELLS OF FAT-CONTAINING, MASSES AND FOOD ARTICLES PRODUCED THEREBY

This application is a continuation of application Ser. No. 08/252,561, filed Jun. 1, 1994, now abandoned.

The present invention concerns a method for producing shells of fat-containing, chocolate-like masses for food articles, wherein a mould cavity, which determines the outer shape of the shell, is filled with a mass, and wherein a cooling member having a temperature below 0° C. is subsequently immersed in the mass to define a predetermined shell volume between said member and the mould cavity.

The invention moreover concerns a system for use in the performance of the method, said system comprising at least one mould cavity to receive a mass as well as an associated cooling member adapted to be cooled to a temperature below 0° C. and then to be immersed in the mass and be kept in it for a predetermined period of time to define a predetermined shell volume between the member and the mould cavity.

EP 0 589 820 discloses a method and a system of the type mentioned above. In operation of the system a mould cavity is filled with a chocolate-like mass in an amount which is e.g. 10% larger than the volume of the finished shell. Then the cooling member, which has preferably been cooled to 31 15° C. to –30° C., is immersed in the chocolate mass and is kept in a fully immersed position in i, preferably for about 2–3 seconds. The chocolate-like mass will then solidify rapidly during crystallization from the cooling member and outwardly end will readily release the cooling member, which can be lifted up and out of he mould cavity. In this method, the prepared state and in particular the viscosity of the mass during tempering has no importance for the consumed amount of chocolate-like mass, which makes it possible to produce shells having a completely uniform shell thickness and volume.

However, the upper rim of the shells must be cleaned of excess mass in a conventional manner, preferably around the edge of the mould cavity, before the shells can be further processed to finished articles.

Where two shells are to be joined along their cleaned, e.g. clean-cut rims, to a hollow body, the shell rims are heated locally, and the shells are joined subsequently.

In the conventional shell producing methods, in which a single shell is produced at a time, the excess mass at the shell rim is removed, while maintaining an engagement face on the shell rim with the full shell thickness. When two shells are subsequently joined to a hollow body, a relatively strong heating of the shell rim is therefore necessary to ensure that sufficient mass provides a tight joint between the two shells. A tight joint is necessary in particular where shells are to be filled with a viscous content. It has been found that the conventional methods have difficulty in always providing a tight joint. Further, the locally molten mass at the shell rims frequently flows out on the outer side of the shells and imparts a disuniform appearance to these and often give rise to discoloration of the shell edge and frequently also ditties the production equipment.

In the conventional methods, the removed excess mass from the shell rim is included in the process again, which results in a corresponding unnecessarily high consumption of energy. Moreover, owing to the recirculating excess mass the demands on cleanliness and hygenic standard are particularly great in the conventional methods.

Accordingly, there is a need for providing a method and a system for the production of shells having a well-defined geometry, while eliminating the excess recirculating mass.

The method of the present invention is characterized by immersing the cooling member so far down in the mass as to press this up into an upper reception volume which upwardly defines the predetermined shell volume along the shell rim. The system of the present invention is characterized in that the cooling member comprises protruding engagement parts which peripherally extend along the upper part of the cooling member and are adapted to engage the upper parts of the mould cavity, said protruding engagement parts moreover comprising one peripherally extending recess which provides a reception volume which upwardly defines the predetermined shell volume along the shell rim.

Accordingly, a method and a system are provided, capable of producing shells of fat-containing, chocolate-like masses which can subsequently be joined directly with other parts to provide a tight joint free of outflowing excess mass, without it being necessary to finish the shell rim prior to the joining.

The well-defined geometry of the reception volume determines the maximally achievable size of the shell rim for the given tool, which, other things being equal, is obtained by an accurately metered, dosed amount of chocolate-like mass which is poured into the mould cavity and fills the reception volume completely in the process.

The reception volume, providing the well-defined geometry of the shell rim, can also "accommodate" the small changes that might occur in the dosed amount of chocolate-like mass in the mould cavity. The mass will simply "rise" in the reception volume to fill it almost completely. The well-defined geometry of the shell rim obviates the conventional cleaning of the rim prior to joining and ensures a well-defined local heating region of the rim prior to the subsequent joining with other parts.

It may be ensured in particularly expedient embodiments of the invention that the upper part of the shell rim, which has been received in the upper reception volume, is forced inwardly toward the interior of the shell in the subsequent joining. In particular, joining of two shells to a hollow body may involve making two associated shells, each having its own geometry of the shell rim, which ensures "geometrical" locking of two shell rims, and which also ensures a particularly tight joint, where the locally heated mass on the shell rim of at least one shell will always run inwardly toward the interior of the shells.

The invention concerns a method and a system for the production of shells for use in the subsequent production of food articles. The shells are made of thermoplastic food materials, i.e. materials which become soft and mouldable (liquid) by heating and are given a stable shape in the subsequent cooling.

The food materials may e.g. be chocolate which is based on a predetermined content of pure cocoa butter.

Further, the food materials may be such as have the cocoa butter replaced wholly or partly by other fats, e.g. the so-called compound chocolate in which the cocoa butter has been replaced by palm-kernel oil or corresponding oils.

The food materials may also be based on a mixture of sugar and fat, e.g. caramel, which can likewise be moulded as described.

In the subsequent treatment of the shell to the finished food article the shells are frequently provided with a center mass of a food material which differs from that from which the actual shell is made; the center mass is frequently a fat-based center or a sugar-based center, such as creme. Then the shell is closed either with other shell parts along the periphery or by means of a coating.

Further, it is also possible for the manufactured shells to be joined with other shell parts immediately after the manufacture, the finished food article being present as a hollow body e.g. in the form of an Easter egg or figures, having closed cavities such as pixies, and the like.

It should finally be mentioned that the manufactured shells do not have to consist of just one material, but may e.g. consist of several layers of a chocolate-like material. For example, one shell made of dark chocolate may be provided with en interior coating of white chocolate (or vice versa) by the same method and system, before the shell manufactured first leaves the mould cavity. The interior coating may penetrate area-wise through openings in the exterior coating produced first.

Further, two separately manufactured shells—an interior shell and an exterior shell—may be combined after the manufacture e.g. by an intermediate layer of a lamination mass which "glues" the two shells together.

Expedient embodiments are defined in the appended claims. As stated in the claims, the invention moreover concerns food articles and shells made by the method and the system as well as uses of the system.

Figure 2:
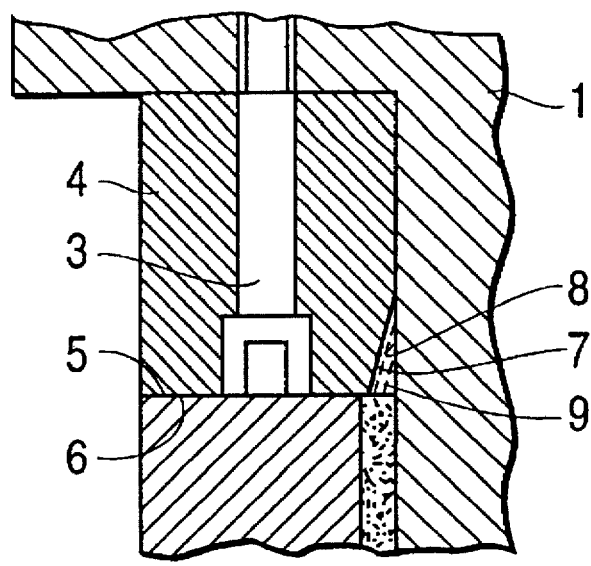
Figure 5C:
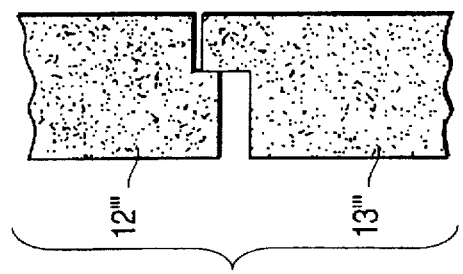
Figure 4:
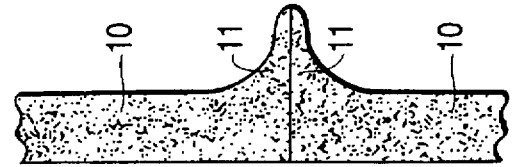
Figure 5B:
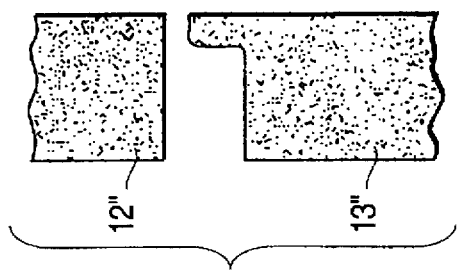
Figure 3:
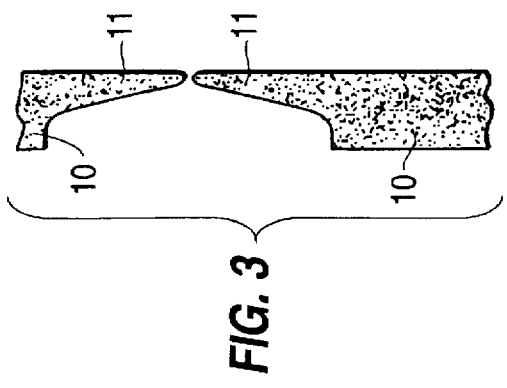
Figure 5A:
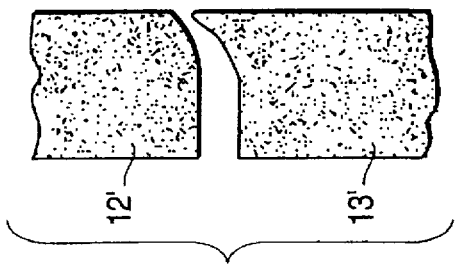

The method and the system of the invention will be explained more fully below with reference to particularly preferred embodiments as well as the drawing, in which FIG. 1 is a lateral schematical cross-sectional view through a cooling member and en underlying mould cavity filled with a chocolate mass, FIG. 2 is an enlarged sectional view through a fragment of an upper part of another embodiment of the cooling member, FIG. 3 is a schematical, enlarged, partially sectional view of the rims of two opposed shells prior to joining, FIG. 4 shows the same after the joining of the shells to a hollow body, FIGS. 5a–c show various embodiments of opposed shell rims prior to joining and with geometrical cross-sectional shapes complementary in pairs, and FIGS. 6a and b are cross-sectional and enlarged views of a filled praline and a slab, respectively, having a shell made according to the method.

The cooling member 1 shown in FIG. 1 is shaped as a male part having an outer shape which e.g. corresponds with the inner shape of en underlying mould cavity 2. The mould cavity 2 is just one of many cavities in a mould plate which is preferably made of a hard plastics material. A system comprises many mould plates and cooling members, and for clarity just one mould cavity and one associated cooling member 1 incorporated in a system are shown. The mould plates of the system may be moved continuously past below the cooling members and be kept stationary when the chocolate shells are made, or may be advanced synchroneously with the cooling members. The system comprises means for controlling the up and down movement of the cooling members as well as residence time in the fully immersed position in the mould cavities 2 as well as means for controlling the advancing movements of the mould plates. The arrangement of the cooling members 1 in the lower position can be adjusted.

The cooling members 1 moreover comprise means adapted to cool the cooling members to a so-called supercooled state at a temperature about −15° C. to −30° C. Before the chocolate mass is filled into the mould cavities 2, the mass is tempered to a temperature between 27° C. and 32° C., according to the composition of the mass. The mould cavity 2 is kept at a temperature which is lower than the temperature of the chocolate mass.

In the particularly expedient embodiment shown in FIG. 1 the cooling member 1 is provided with an engagement ring 4 mounted exteriorly around the freezing member 1, e.g. by a press-fit or by threaded engagement 3, as shown in FIG. 2. The downwardly directed face 5 of the engagement ring 4 preferably engages an upwardly directed face 6 on the upper parts of the mould cavity 2 when the freezing member 1 is in its lower position, the predetermined shell volume being defined between the member 1 and the mould cavity 2.

In the embodiment shown in FIG. 1 the engagement ring 4 comprises an obliquely bevelled interior and annular face 7. The interior face 7 of the engagement ring 4 and the exterior face 8 of the cooling member 1 define between them an annular recess or reception volume 9, as shown in greater detail by the enlarged view of FIG. 2. The reception volume 9 upwardly defines the predetermined shell volume 10 along the shell rim 11 (see FIG. 3).

In the embodiment shown in detail in FIGS. 1 and 2 the reception volume 9 extends along the shell rim 11 in the vicinity of the inner side of the shell which is defined by the cooling member 1.

The subsequent joining of a shell 10 made by the method and the system of the invention with other parts, such as a plate or the rim on another shell, obviates the energy-consuming preceding cutting of excess mass along the shell rim, while providing a tight joint.

Two shells 10 made with the tools 1, 2 shown in FIGS. 1 and 2 are shown in FIGS. 3 and 4 before and after, respectively, the joining of the shell rims 11, 11. The predetermined cross-sectional geometry of the shell rims 11, 11 is ensured via the determined geometry of the reception volume 9, which is V-shaped in the embodiment shown in FIGS. 1–4. This geometry of the shell rims 11 ensures that the locally heated shell rims will always be pressed in a direction inwardly toward the interior of the shells 10 when the shells 10 are pressed together. Possible discoloration from the excess mass will thus not be visible on the outer side of the hollow body.

The embodiments shown in FIGS. 5a–5c involve cross-sectional geometries of the shell rims which are complementary in pairs, but different. It should be mentioned that a form of geometrical "locking" between the shells 12', 12", 12'", 13', 13" and 13'" is obtained in the embodiments shown in FIGS. 5a–5c, no matter whether the rims are heated or not. The shell rims may also be provided with conical faces or beads as well as optionally complementary grooves or the like, which additionally ensure a geometrical "locking". The beads may e.g. be provided area-wise around the periphery and extend vertically.

Figure 6A:
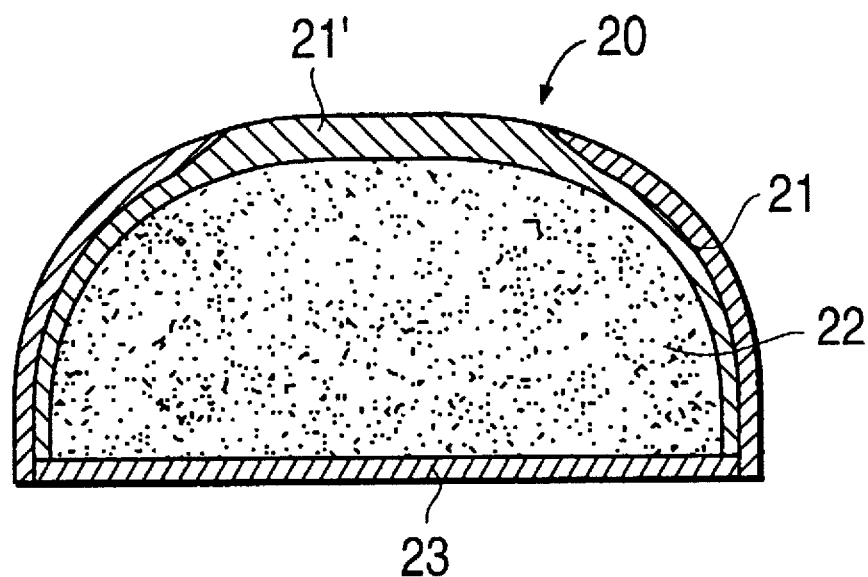

The praline 20 shown in FIG. 6a comprises an outer shell 21 of dark chocolate which is made by the system of the invention. The shell 21 is filled in a conventional manner with a mass 22, such as cream or other chocolate mass optionally containing ingredients, and the bottom 23 of the praline is subsequently closed by a coating of a chocolate layer or by joining the shell with a plate along the rim. The shell 21 may be provided with an interior coating 21' of e.g. white chocolate, which, area-wise, has penetrated through openings in the shell 21.

Figure 6B:
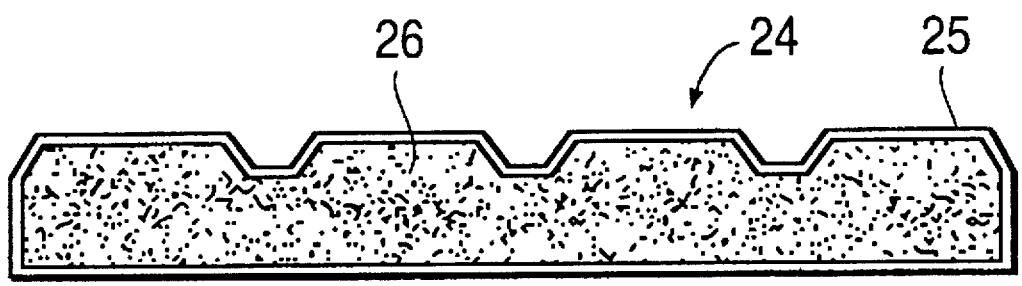

The slab 24 shown in FIG. 6b comprises a shell 25 of chocolate made by the system of the invention. The shell 25 is filled with a mass 26, such as a peppermint center or nut-containing chocolate mass, before the bottom is closed, as described above.

It should finally be mentioned that many modifications can be made within the scope of the invention. Thus, the reception volume may be given many different cross-sectional geometries. The invention has been described with reference to a stationary, fixed mounting of the engagement ring on the cooling member. However, the engagement ring 4 may also be mounted axially spring-loaded, e.g. by means of a rubber insert. This is an advantage in particular where complete filling of the reception volume by a chocolate-like mass is desired when the cooling member is immersed. The axial travel of the engagement ring will hereby compensate for inaccuracies in the dosing of the predetermined amount of chocolate-like mass.

I claim:

1. A method of producing shells of fat-containing masses for food articles, which method comprises the steps of;
    (a) filling at least one mould cavity having an inner surface, which determines the outer shape of the shell to be produced, with a tempered fat-containing mass;
    (b) immersing a cooling member, which has an outer surface which determines the inner shape of the shell to be produced and which has been cooled to a temperature below 0° C., into the mass to press the mass upwardly into a predetermined shell volume defined by the outer surface of the cooling member and the inner surface of the mould cavity, and form a shell of said mass; and
    (c) continuing to immerse the cooling member into the tempered mass so as to cause a portion of the mass to flow upwardly into a reception volume extending above the shell volume so as to form a shell rim of reduced thickness extending upwardly from the shell.

2. The method of claim 1, wherein the cooling member is immersed into the mass so as to partially fill the reception volume.

3. The method of claim 1, wherein the cooling member is immersed in the mass so as to completely fill the reception volume.

4. The method of claim 1, wherein the produced shells are employed for filled food articles.

5. The method of claim 4, wherein the food for the particles are pralines or slabs.

6. The method of claim 1, wherein the produced shells are used for Easter eggs or figures having closed cavities.

7. A device for producing shells of fat-containing masses for food articles, comprising (a) at least one mould cavity for receiving a fat-containing tempered mass, and (b) a cooling member adapted to be cooled to a temperature below 0° C. and then immersed into the mass in the mould cavity and kept therein for a predetermined period of time to form a shell of said mass in a predetermined shell volume defined between the immersed cooling member and the mould cavity, wherein the cooling member has a protruding engagement part which extends peripherally around an upper portion of the cooling member and is adapted to engage an upper part of the mould cavity, said protruding engagement part and the upper portion of the cooling member being spaced to form at least one recess therebetween extending upwardly from the shell volume which provides a reception volume for receiving a portion of the mass to form a shell rim of reduced thickness extending upwardly from the formed shell.

8. The device according to claim 7, wherein the recess forms a shell rim that extends upwardly from an outer side of the shell.

9. The device according to claim 7, wherein the recess forms a shell rim that extends upwardly from an inner side of the shell.

10. The device according to claim 7, wherein the recess extends completely around the periphery of the cooling member.

11. The device according to claim 7, wherein the recess has a V-shaped cross-section which tapers in an upward direction.

12. The device according to claim 7, wherein the recess has a rectangular cross-section.

13. The device according to claim 7, wherein the engagement part is an engagement ring mounted exteriorly around the periphery of the cooling member and the recess is defined between an exterior face of the cooling member and an interior, annular face on the engagement ring.

14. A food article comprising a shell of a fat-containing mass produced by the method of claim 1 and having an exterior face which is an impression of an interior face of the mould cavity, an interior face which is an impression of an exterior face of the cooling member and a shell rim of a reduced thickness extending upwardly from the shell.

15. The food article according to claim 14, wherein the shell contains a filling material.

16. The food article according to claim 14, wherein the shell comprises at least two layers of a fat-containing mass.

17. The food article according to claim 14, wherein the shell is provided with an exterior coating.

18. The food article according to claim 17, wherein the shell comprises at least two layers of a fat-containing mass.

* * * * *

UNITED STATES PATENT AND TRADEMARK OFFICE
CERTIFICATE OF CORRECTION

PATENT NO. : 5,635,230
DATED : June 3, 1997
INVENTOR(S) : Lars Aasted

It is certified that error appears in the above-indentified patent and that said Letters Patent is hereby corrected as shown below:

Title page, lines 2-3 of title, change "FAT-CONTAINING, MASSES" should be changed to --FAT-CONTAINING MASSES--; and Assignee, change "Aasted-Mikkoverk Aps" to --Aasted-Mikroverk Aps--.

Signed and Sealed this

Thirtieth Day of September, 1997

*Attest:*

BRUCE LEHMAN

*Attesting Officer*     *Commissioner of Patents and Trademarks*